United States Patent [19]

Lindsay et al.

[11] Patent Number: 4,681,395
[45] Date of Patent: Jul. 21, 1987

[54] TIME-DOMAIN INTENSITY NORMALIZATION FOR FIBER OPTIC SENSING

[75] Inventors: Thomas A. Lindsay, Brier; Randall E. Morton, Redmond, both of Wash.

[73] Assignee: Eldec Corporation, Lynnwood, Wash.

[21] Appl. No.: 704,324

[22] Filed: Feb. 22, 1985

[51] Int. Cl.⁴ ............................ G02B 6/28; G02F 1/015
[52] U.S. Cl. .................................... 350/96.16; 455/612
[58] Field of Search ............... 350/96.16, 96.24, 96.29, 350/96.3; 455/610, 611, 612

[56] References Cited

U.S. PATENT DOCUMENTS

| | | | |
|---|---|---|---|
| 4,089,584 | 5/1978 | Polczynski | 350/96.16 |
| 4,182,935 | 1/1980 | Chown | 179/15 |
| 4,294,513 | 10/1981 | Nelson et al. | 350/96.29 |
| 4,313,192 | 1/1982 | Nelson et al. | 370/4 |
| 4,375,680 | 3/1983 | Cahill et al. | 455/612 X |
| 4,420,752 | 12/1983 | Davis et al. | 455/612 X |
| 4,430,572 | 2/1984 | Eve et al. | 455/610 X |
| 4,432,599 | 2/1984 | McMahon | 350/96.15 |
| 4,436,995 | 3/1984 | Whitten | 250/227 |

OTHER PUBLICATIONS

Conference Proceedings from the 2nd International Conference on Optical Fiber Sensors held on Sep. 5-7, 1984 at Liederhalle Stuttgart, Fed. Republic of Germany.

Primary Examiner—Eugene R. LaRoche
Assistant Examiner—Steven J. Mottola
Attorney, Agent, or Firm—Christensen, O'Connor, Johnson & Kindness

[57] ABSTRACT

Disclosed is a fiber optic sensing system wherein a pulsed light source signal (12) propagates along a single optical waveguide (14) and is split into component signals (20) and (22) at a sensor unit (16). The intensity of one component signal (20) is varied by a transducer (28) through which the signal passes. The second, reference, component signal (22) passes through a delay optical fiber (30) and has its propagation delayed with respect to the other component signal (20). The delayed and undelayed component signals are then coupled and propagate along a single waveguide (34) to a receiver (36). The system is constructed so that intensity-varying factors inherent in the system, other than the sensor-induced variations, are identically shared by the two component signals. Accordingly, signal processing circuitry (38) calculates a simple ratio of the delayed and undelayed signals which yields the sensor-intensity variation independent of any other intensity-varying factors.

22 Claims, 12 Drawing Figures

TIME-DOMAIN INTENSITY NORMALIZATION FOR FIBER OPTIC SENSING

BACKGROUND OF THE INVENTION

This invention relates to fiber optic sensing systems wherein a sensor is interposed in the system between a light source and a receiver and wherein the sensor is responsive to a parameter to alter the intensity of the light passing therethrough.

Fiber optic sensing systems generally utilize a sensor interconnected by optical waveguides between a light source and a receiver. The sensor includes one or more transducers that respond to an external parameter, for example ambient pressure, to vary the intensity of an optical signal that is generated by the light source for propagation through the system. An example of a typical application would be one in which a transducer attenuates the intensity of the light signal in inverse proportion of the magnitude of the parameter. The receiver defects the change in intensity of the signal. Suitable processing circuitry then produces an indication of the magnitude of the parameter.

The intensity of the light that propagates through the system is not varied solely by the transducer in the sensor. That is, numerous other factors tend to vary the intensity of the propagating light. The most significant of these factors include: variations in light source intensity; connector losses; and, fiber path losses. These factors are inherent in the construction of the system and their effects will vary with the age of the system and changes in the environment surrounding the system. For accurate determination of the intensity variation caused solely by the transducer(s) it is necessary to compensate for the additional intensity variations caused by these other factors.

In order to provide proper compensation for the intensity variations that are caused by factors other than the transducer, it has been recognized in the prior art that the receiver should be provided with a reference signal that propagates along an optical path that is separate from the path of the signal whose intensity is varied by the transducer (the latter signal hereinafter referred to as the "sensed signal"). This separate optical path, which allows the reference signal to be distinguished from the sensed signal, is defined by an optical waveguide that is constructed to be substantially identical to the sensed signal optical waveguide except that it bypasses the transducer. That is, the length, connectors and other elements of the reference waveguide match, as nearly as possible, those corresponding elements of the sensed signal waveguide. The separate optical path for the reference signal also necessitates the use of matched separate receiver channels with their associated connectors. By matching the waveguide elements, both the reference and sensed signals should undergo substantially identical intensity variations caused by the above-described factors. As noted, the reference signal bypasses the transducer, thus its intensity is not further varied by the transducer. Normalizing the sensed signal intensity (i.e., taking a simple ratio of the sensed signal to the reference signal) will yield the dimensionless value of intensity variation caused by the transducer—irrespective of the intensity variations caused by the other factors.

A problem with the just-described compensation method is that with the present state of the art it is extremely difficult to precisely match optical paths for duplicating all intensity-varying factors. To give an example, for a typical optical signal path, the decoupling and remating of a single connector may cause a change in the transmitted intensity by as much as 50%. Where it is desirable to employ a transducer having an accuracy on the order of 0.1% it can be appreciated that when attempting to match waveguides that employ several connectors, a rather significant opportunity for error is introduced each time a connection is decoupled and remated. Furthermore, short radius bends (less than 5 centimeter bend radius) can introduce attenuation on the order of several percent in an optical waveguide. Thus, if the reference signal waveguide and the sensed signal waveguide are not properly matched, or if after matching, one of the waveguides is bent, disconnected and remated, or otherwise moved relative to the other waveguide, then the resulting normalization of the sensed signal intensity will not accurately reflect the intensity variation caused solely by the transducer.

SUMMARY OF THE INVENTION

This invention generally provides a fiber optic sensing system that overcomes the above-noted problems in the prior art by employing a reference signal, distinguishable in the time domain from the sensed signal, that propagates along substantially the same path as the sensed signal such that the relationship between the reference and the sensed signal is independent of other variation factors. The system formed in accordance with this invention obviates the need for matching several separate waveguide elements. Thus, the determination of the intensity variation caused by the transducer is unaffected by other intensity varying factors since both the reference and sensed signals are identically influenced by those factors.

This invention specifically provides a fiber optic sensing system for sensing an external parameter that comprises: a source for producing an optical signal of any selected intensity; a receiver; an optical waveguide element interconnected between the source and the receiver, the optical waveguide element providing a single path for propagation of the optical signal between the source and the receiver; a sensor unit connected to the optical waveguide element between the source and the receiver, the sensor unit including two branch optical waveguides, each branch optical waveguide having an input end and an output end, the branch optical waveguides being coupled in common to the optical waveguide element at both their input and output ends, the branch optical waveguides being configured and arranged so that a component of the optical signal propagates through each branch optical waveguide; delay means coupled to one of the branch optical waveguides between its input end and its output end for delaying the propagation of the component of the optical signal that is associated with the branch optical waveguide to which the delay means is connected; and, transducer means coupled to one of the branch optical waveguides between its input end and its output end for varying the intensity of the component of the optical signal that is associated with the branch optical waveguide to which the transducer means is connected.

Also included in the preferred embodiment is signal processing circuitry for processing the components of the optical signal to determine the variance of the component signal intensity effected by the transducer, irrespective of any intensity variations that may be caused by factors other than the transducer.

DESCRIPTION OF THE PREFERRED EMBODIMENT

Figure 1:
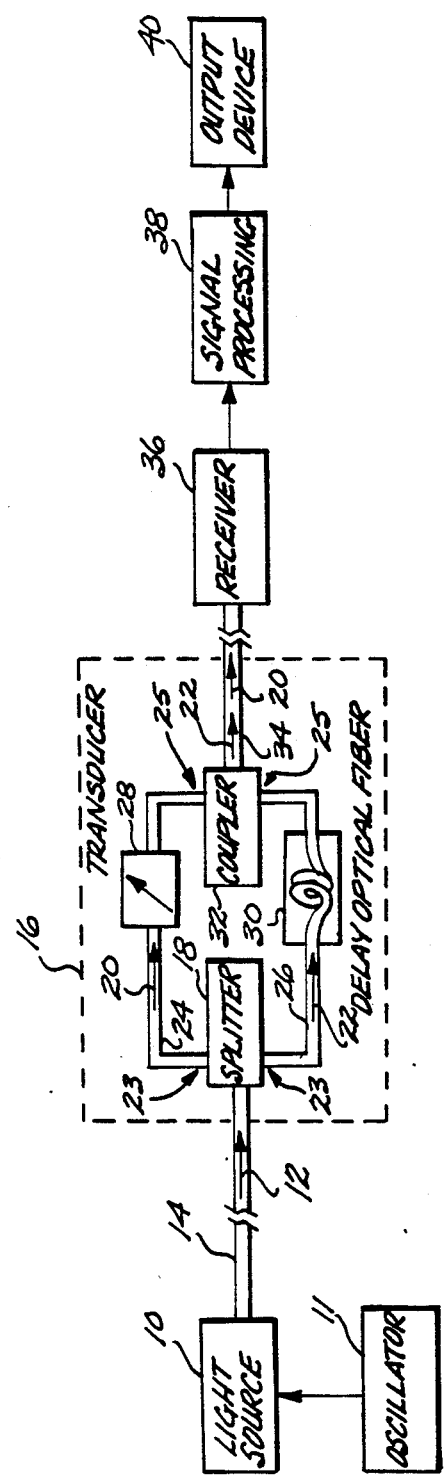
FIG. 1 is a block diagram of a fiber optic sensor system made in accordance with this invention.

Referring to FIG. 1, illustrated is the preferred embodiment of the invention. Specifically, light source 10, which is modulated by oscillator 11, generates a pulsed source optical signal 12 (indicated by an arrow in the figure) for propagation along a connected main optical waveguide 14. The light source 10 that generates the pulsed source signal may be a light-emitting diode or other suitable optical source constructed by techniques well known in the art. In the preferred embodiment, the main optical waveguide 14 is a single optical fiber and can be of any desired length. It is understood that main optical waveguide 14 can also be formed from a bundle of optical fibers. In any event, the main optical waveguide 14 provides a single optical path for propagation of the source optical signal 12.

Figure 2:
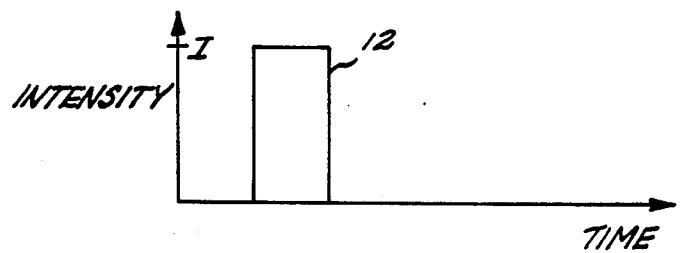
FIG. 2 is a diagram of the source optical signal as it propagates between the light source and the sensor unit.

Shown in FIG. 2 is a diagram of a single pulse source signal 12 of intensity I as observed at a point along main optical waveguide 14. The source signal 12 is generated with intensity $I_o$, which may vary due to uncontrollable variations in the structure or energy supply of the light source 10. Nevertheless, as will be understood upon reading this description, such variation will be compensated in the processing circuitry of the system formed in accordance with this invention.

With continued reference to FIG. 1, the main optical waveguide 14 terminates within a sensor unit 16. Specifically, within the sensor unit 16 the main optical waveguide 14 is connected to a splitter 18 that splits the source signal into two component signals 20 and 22 (also indicated by arrows) for propagation along respective branch optical waveguides 24 and 26, which are connected at their input ends 23 to the splitter 18. Like the main optical waveguide 14, branch optical waveguides 24 and 26 are also formed of single optical fibers or fiber bundles.

The intensity of component signal 20 can be represented by $I_s$ and the intensity of component signal 22 can be represented by $I_r$. As will become evident upon reading this description, component signal 20 is the sensed signal; component signal 22 is the reference signal.

It is noteworthy that prior to being split, the source signal 12 that propagates along main optical waveguide 14 is subject to a variety of factors that tend to vary its intensity. For example, the connectors used for securing the optical waveguide to the light source 10, the connectors used along the waveguide, and the splitter 18 will all, in some measure, attenuate the intensity of light propagating through the waveguide. Additionally, the optical waveguide itself will attenuate the intensity of light transmitted through it. The degree of attenuation depends upon the length, environment, configuration, and age of the waveguide.

Since the component signals 20 and 22 are formed by splitting the source signal 12, their intensities $I_s$ and $I_r$, respectively, will proportionately share the above-mentioned intensity variation of the source signal 12. The actual values of the component signal intensities will depend upon how the source signal 12 is split. Specifically, the splitter 18 may be adjustable so that its splitting function $\beta$ can be set at any desired value. In the preferred embodiment, the splitting function $\beta$ is set at 0.50. Hence, component signals 20 and 22 begin propagation from splitter 18 with intensities $I_s$ and $I_r$, respectively, that are equal to each other, having the value $(\frac{1}{2})(\delta' I_o)$. Here $\delta'$ represents the collection of factors responsible for the variation of the source signal's intensity as it propagates from the source through the splitter; the value of $\delta'$ being a dimensionless fraction, which when multiplied by the source signal intensity yields the value of that signal intensity as attenuated by those factors.

Component signal 20, with intensity $I_s$, propagates along branch optical waveguide 24, which passes through a transducer 28. Transducer 28 can be any mechanism (such as microbending, macrobending, varying density, etc.) that is responsive to an external parameter (for example, temperature, pressure, fluid levels, etc.) and is capable of varying the intensity of the propagating light in some functional relationship with the parameter magnitude. In the preferred embodiment, transducer 28 attenuates the intensity $I_s$ of component signal 20 in inverse proportion to the magnitude of the parameter being sensed. Alternatively however, it is recognized that the transducer 28 can operate to either completely attenuate or have no affect upon the intensity of the component signal, depending on the state of the parameter. An example of such a transducer would be a simple switch wherein propagation of the component signal is stopped when the switch is in the open position; a closed switch allowing propagation of the signal with its intensity substantially unaffected.

In the preferred embodiment, component signal 20 exits transducer 28 with its intensity attenuated by an amount corresponding to transducer variation function $\alpha$. Accordingly, the intensity $I_s$ of the component signal 20, after passing through transducer 28, is represented by $(\alpha/2)(\delta' I_o)$. $(0 \leq \alpha \leq 1)$.

The other component signal 22 propagates along branch optical waveguide 26. As noted in the preferred embodiment, component signal 22 is used as a reference signal for the hereinafter-described processing. In order for this signal to be utilized, however, it is necessary to distinguish it from the component signal 20 that is affected by transducer 28. To this end, a delay optical fiber 30 is incorporated into branch optical waveguide 26 for the purpose of delaying the propagation of the associated component signal 22 relative to that of component signal 20. The delay optical fiber 30 is simply a length of optical fiber, preferably formed into a coil. The amount of time it takes for a signal to propagate through the delay optical fiber (i.e., the delay duration $t_d$) is equal to the product of the length of the fiber and its index of refraction divided by the speed of light in a vacuum. Besides delaying the propagation of the associated signal, delay optical fiber 30 may cause some attenuation of the intensity $I_r$ of the reference signal. In the preferred embodiment, any such attenuation may be compensated for by the incorporation of any suitable attenuation device (e.g., fixed gap or microbending) into the splitter 18 to cause a corresponding attenuation (absent a significant delay in propagation) in the intensity $I_s$ of the sensed signal 20. It is recognized that this single loss matching requirement can also be readily accomplished by alternative means such as by adjusting the splitting function accordingly. In any event, these matched losses will hereinafter be considered as included in the earlier-described intensity variation factors symbolized as $\delta'$.

The branch optical waveguides 24 and 26 converge and are connected at their output ends 25 to a return optical waveguide 34 by a coupler 32. The undelayed component signal 20 and the delayed component signal 22 thus emerge from the sensor unit 16 and propagate along the return optical waveguide 34.

Figure 3:
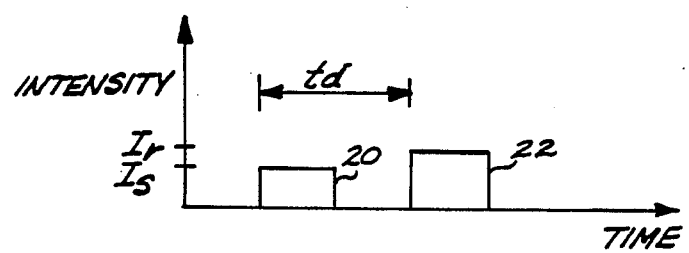
FIG. 3 is a diagram showing one configuration of the reference and sensed signals propagating between the sensor unit and the receiver.
Figure 4:
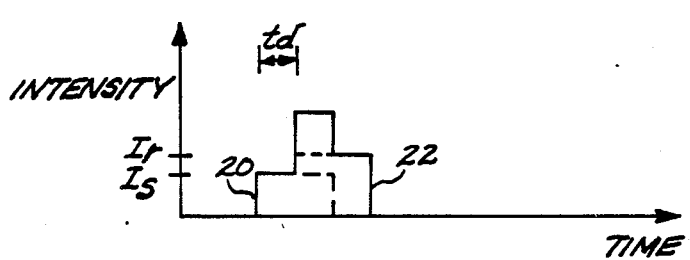
FIG. 4 is a diagram showing another configuration of the propagation of the signals of FIG. 3 wherein the sensed and reference signals overlap.

With reference to FIG. 3 the intensity of the component signals 20 and 22 are represented as they are observed at a point on the return optical waveguide 34. In that figure, $t_d$ represents the duration of the delay caused by delay optical fiber 30. In the preferred embodiment $t_d$ is greater than or equal to the duration of each component signal 20 and 22, hence the signals propagate as discrete pulses along return optical waveguide 34. If $t_d$ is less than the duration of each component signal, the signals will propagate along the return optical waveguide 34 in a configuration as represented in FIG. 4. As illustrated in the FIGURE, however, the intensities $I_s$ and $I_r$ are still identifiable and can be processed in a manner as hereinafter described.

Figure 5:
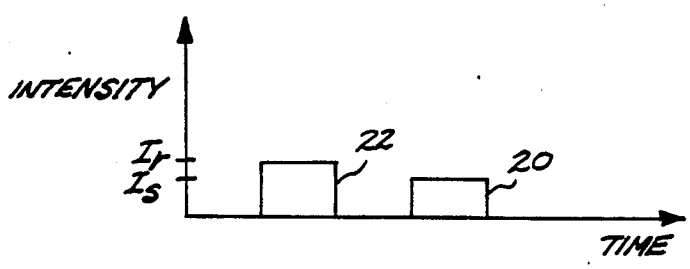
FIG. 5 is a diagram showing still another configuration of the propagation of the signals of FIG. 3 wherein the sensed signal is delayed relative to the reference signal.

FIG. 5 illustrates the component signals 20 and 22 as they would propagate on the return optical waveguide 34 if a modification is made to the preferred embodiment of FIG. 1. Specifically, delay optical fiber 30 can alternatively be incorporated into branch optical waveguide 24 to delay component signal 20 instead of component signal 22. In this case, component signal 22 will merely travel ahead of component signal 20 along the return optical waveguide 34. The relative position of these signals has no significant affect on the subsequent processing of them.

Returning to FIG. 1, return optical waveguide 34 is connected between the coupler 32 and a receiver 36. It is pointed out that the return optical waveguide 34, like main optical waveguide 14, is formed of either a single optical fiber or bundle of fibers to provide a single optical path. Hence, component signals 20 and 22 that propagate along the return optical waveguide 34 will both be subject to intensity-varying factors defined as $\delta''$ as these signals travel through the coupler 32, along return optical waveguide 34 and into the receiver 36. It is also pointed out that since return optical waveguide 34 provides a single optical path, component signals 20 and 22 will be identically affected by those intensity-varying factors $\delta''$.

Receiver 36, which utilizes a single channel, incorporates a photodetector, amplifier and appropriate circuitry for detecting component signals 20 and 22 and converting them into representative electrical signals. Such circuitry forms no part of this invention and is readily designed by those skilled in the art. As illustrated in FIG. 1, the electrical signals representative of component signals 20 and 22 (and their corresponding intensities $I_s$ and $I_r$) are transmitted to signal processing circuitry.

For the purposes of analysis, the intensity of component signal 20 as it reaches the receiver is symbolically represented as:

$$I_{sd} = \beta(I_o)(\delta')(\delta'')(\alpha)$$

where
- $I_o$ = intensity of source signal 12;
- $\beta$ = known splitter function ($0 \leq \beta \leq 1$);
- $\alpha$ = unknown variation function of transducer 28;
- $\delta'$ = unknown system intensity variation factors residing in the system between the source and through the splitter;
- $\delta''$ = unknown system intensity variation factors residing in the system through the coupler and to the receiver.

The intensity of component signal 22 as it reaches the receiver is represented as:

$$I_{rd} = (1-\alpha)I_o(\delta')(\delta'').$$

Figure 6:
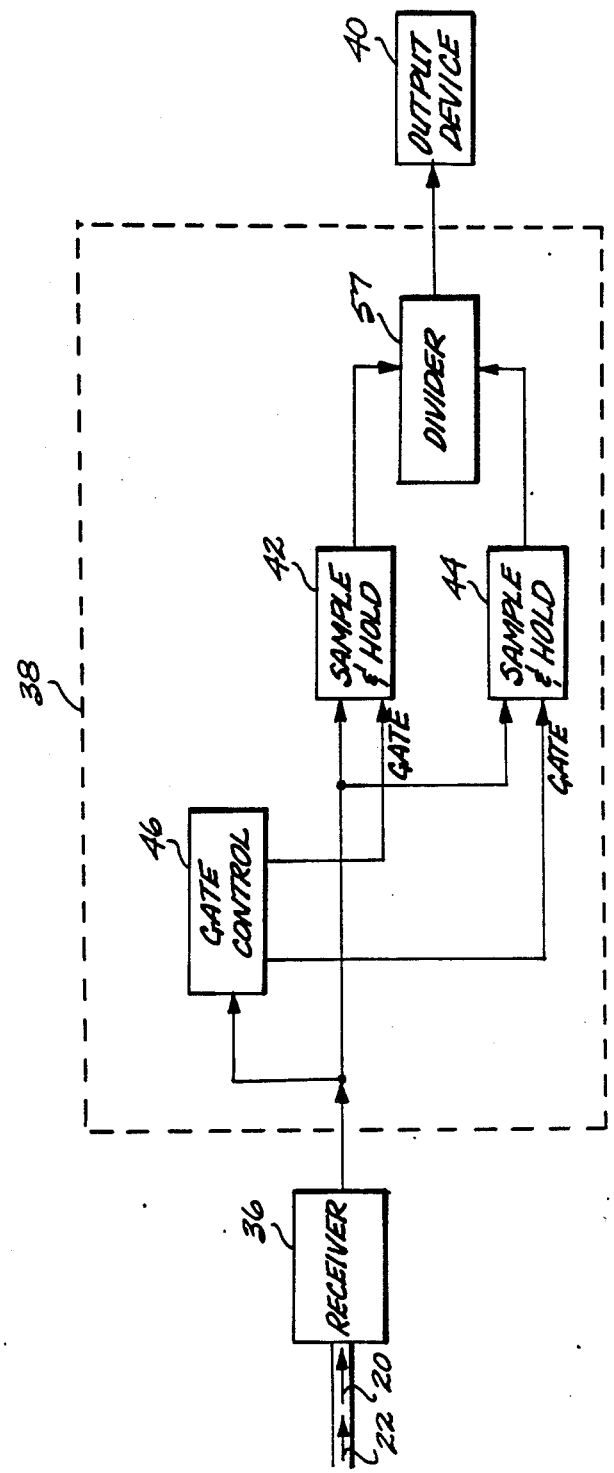
FIG. 6 is a diagram of the circuitry for the signal processing used to process the signals emanating from the sensor of the preferred embodiment.

As described earlier, apart from the effects of the transducer 28, the final detected intensities $I_{sd}$ and $I_{rd}$ have each undergone identical variations $\delta'$ and $\delta''$. The signal processing circuitry 38, as shown in more detail in FIG. 6, consists of sample and hold circuits 42 and 44 operatively associated with gate control 46. Gate control 46 generates signals corresponding to the sensed and reference pulses emanating from receiver 36 that are synchronized with those pulses to cause acceptance (by conventional gating mechanisms) of each pulse by its appropriate sample and hold circuit 42 or 44. Each pair of sensed and reference pulses then proceed to divider circuitry 57, which computes a simple ratio of the intensities $I_{sd}$ and $I_{rd}$ of those pulses:

$$\frac{\beta(I_o)(\delta')(\delta'')(\alpha)}{(1-\beta)(I_o)(\delta')(\delta'')} = \frac{\beta(\alpha)}{(1-\beta)}$$

and with $\beta$ in the preferred embodiment = 0.50, the above ratio yields the precise value of transducer variation function $\alpha$—independent of any other intensity variation factors. Finally, the value of the transducer variation function $\alpha$ and/or the related magnitude of the parameter is displayed or recorded on a suitable output device 40.

In addition to the just-described preferred embodiment of the invention, alternative embodiments can be accommodated. For example, as one alternative, the light source 10 can be oscillated to produce a continuous wave source signal. With this approach, the reference and sensed signals do not propagate as discrete signals but are constituent portions of a continuous composite waveform that is formed by the coupler in the sensor unit. The hereinafter-described processing of the composite signal extracts the appropriate portions of the composite signal to construct sensed and reference signals and then normalize the former with respect to the latter.

Figure 7:
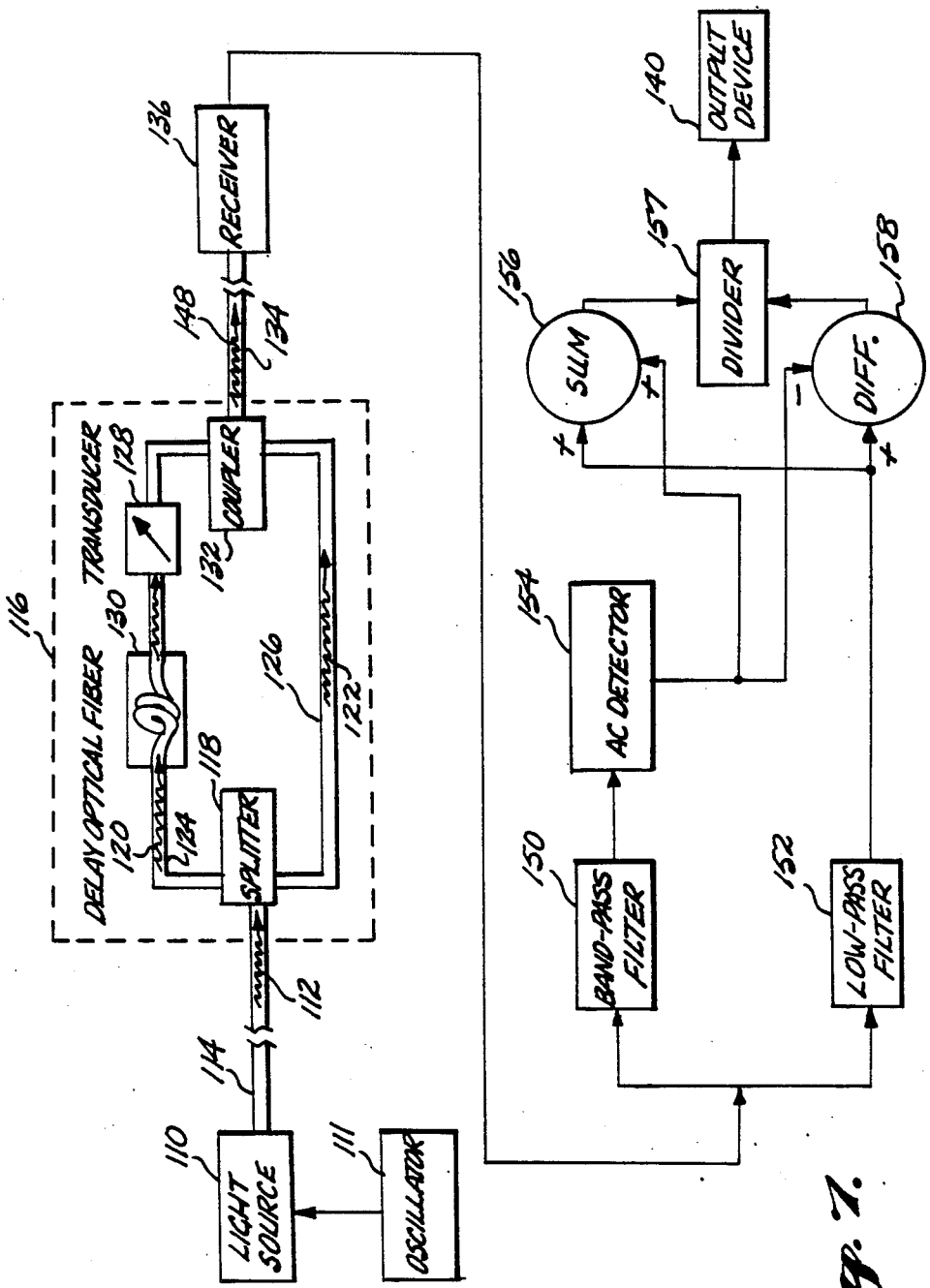
FIG. 7 is a block diagram of an alternative embodiment of this invention wherein the light source is oscillated to produce a continuous wave optical signal.

More particularly, with respect to this embodiment and reference to FIG. 7, light source 110 is modulated by oscillator 111 so that source signal 112 is a continuous wave signal. In the following description of this alternative embodiment, a pure sine wave will be discussed; however, the principles apply likewise to any modulated wave. Preferably, a fully modulated wave having a 50% duty cycle is utilized in order to avoid the need for any waveform compensation mechanisms. In this embodiment, the light source 110 is modulated so that the period T of the resulting wave is equal to twice the delay duration $t_d$ of the delay optical fiber 130.

The continuous wave source signal 112 passes through the splitter 118 (with the splitter function $\beta$ equal to 0.50), where the signal is formed into two component signals 120 and 122, each being described by its AC and DC portions as:

$$(\tfrac{1}{2})(I_a\delta' \cos \omega t + I_a\delta')$$

where $I_a$ is equal to the average value of the modulated source intensity and, as before, $\delta'$ represents the collection of factors responsible for the variation of the source signal's intensity as it propagates from the source through the splitter. It is pointed out that the terms "AC portion" and "DC portion," herein used in the context of optical signal transmissions, refer to the time-varying magnitude and time-average values of the signal respectively.

It is pointed out that this alternative embodiment utilizes essentially the same sensor unit structure 16 as the preferred embodiment. As shown in FIG. 7, however, the delay optical fiber 130 is incorporated into branch optical waveguide 120. As noted earlier, the location of the delay optical fiber will not significantly affect subsequent processing.

Upon exiting the transducer 128, the intensity $I'_s$ of the component signal 120 is described:

$$I'_s = (\alpha/2)(I_a\delta' \cos(\omega(t-t_d)) + I_a\delta').$$

As noted earlier, the period T of the continuous wave source signal 112 (hence the period of each component signal 120 and 122) is selected to be equal to twice the delay duration $t_d$ of the delay optical fiber 130. Thus, in passing through the delay optical fiber 130 a relative delay of T/2 or one half cycle (expressed as $\pi$ radians), is experienced by the component signal 120. The intensity of that signal is thus described:

$$I'_s = (\alpha/2)(I_a\delta' \cos (\omega t - \pi) + I_a\delta')$$

which, with $\cos(\omega t - \pi) = -\cos(\omega t)$, becomes $(\alpha/2)\cdot(-I_a\delta' \cos(\omega t) + I_a\delta')$.

The intensity of component signal 122 propagating within branch optical waveguide 126 is described:

$$I'_r = (\tfrac{1}{2})(I_a\delta' \cos(\omega t) + I_a\delta').$$

Within coupler 132 the component signals 120 and 122 are combined to form composite waveform signal 148 for propagation along return optical waveguide 134. Temporarily ignoring intensity losses caused by the coupler, that composite waveform signal has intensity $I'_c$ being equal to the combined intensity $I'_s$ and $I'_r$ or:

$$I_c' = -(\alpha/2)I_a\delta'\cos(\omega t) + (\tfrac{1}{2})I_a\delta'\cos(\omega t) + (\alpha/2)I_a\delta' + (\tfrac{1}{2})I_a\delta'$$

$$= (I_a/2)\delta'(1-\alpha)\cos(\omega t) + (I_a/2)\delta'(1+\alpha).$$

It can be observed that because of the half cycle delay caused by delay optical fiber 130, the combined AC portions of the signal interfere destructively (as evidenced by the $(1-\alpha)$ term). Therefore, when the composite signal is formed by the coupler, the resulting magnitude of the AC portion is equal to the magnitude of the AC portion of component signal 122 as diminished by the magnitude of the AC portion of component signal 120. The DC portions, having no phase, interfere constructively so that the resulting magnitude of the DC portion of the composite signal is equal to the sum of the DC portions of the component signals. When the values of the AC and DC portions of the composite signal are then detected in the hereinafter-described processing circuitry, a reference signal intensity is derived by adding the detected value of the AC portion of the composite signal to the detected value of the DC portion of the composite signal. The effect of this addition is to cancel out the transducer effect since any diminution of the AC portion caused by the variation function of the transducer (through the above-noted destructive interference) is offset by a corresponding increase in the value of the DC portion (through the above-noted constructive interference).

Accordingly, a sensed signal intensity is derived by subtracting the AC portion of the combined signal from the DC portion. The resulting value includes the effects of the transducer variation function $\alpha$ and, of course, other intensity varying factors common to both the sensed and reference signals.

FIG. 7 illustrates the processing circuitry employed for accomplishing the normalization for this embodiment. Specifically, the composite signal 148, shown by the wavy arrow in FIG. 7, exits coupler 132 and propagates along the return optical waveguide 134. As in the preferred embodiment, the composite signal 148 will be subject to intensity varying factors $\delta''$ as it travels through the coupler and along return optical waveguide 134 and into receiver 136. The intensity of the composite signal at receiver 136 is therefore:

$$I_{cd}' = (I_a/2)\delta'\delta''(1-\alpha)\cos(\omega t) + (I_a/2)\delta'\delta''(1+\alpha)$$

$$= \nu(1-\alpha)\cos(\omega t) + \nu(1+\alpha)$$

where $\nu = (I_a/2)\delta'\delta''$.

The composite signal 148 (transformed from an optical signal to a representative electrical signal by the receiver 136) branches into band-pass filter 150 and low-pass filter 152. Band-pass filter 150, which is tuned to the frequency of the modulated light source 110, extracts the AC portion from the composite signal. The AC portion is then routed through AC detector 154 wherein the signal having peak magnitude $v(1-\alpha)$ is extracted. Low-pass filter 152 extracts the DC portion, having magnitude $v(1+\alpha)$, from the composite signal. The AC and DC portions are added in sum circuit 156 to create a reference signal having magnitude 2 v. The AC portion is subtracted from the DC portion in difference circuit 158 to create a sensed signal of magnitude $2v\alpha$. In the divider circuitry 157, to which the output of both the sum and difference circuits is directed, the sensed signal is normalized by determining the ratio of the sensed to reference signal or $$\frac{2v\alpha}{2v}$$

which yields $\alpha$, the transducer variation function which is then displayed and/or recorded on output device 140.

The above-described continuous wave embodiment requires a receiver responsive to the DC or time-average portion of the composite signal without incurring DC drift. As another alternative embodiment, the oscillating source signal can be modified to create an additional AC portion of the continuous wave signal that is distinguishable from the original AC portion of that signal. With two such distinct AC portions, the need for detecting and processing the DC portion of the signal is obviated.

Figure 8:
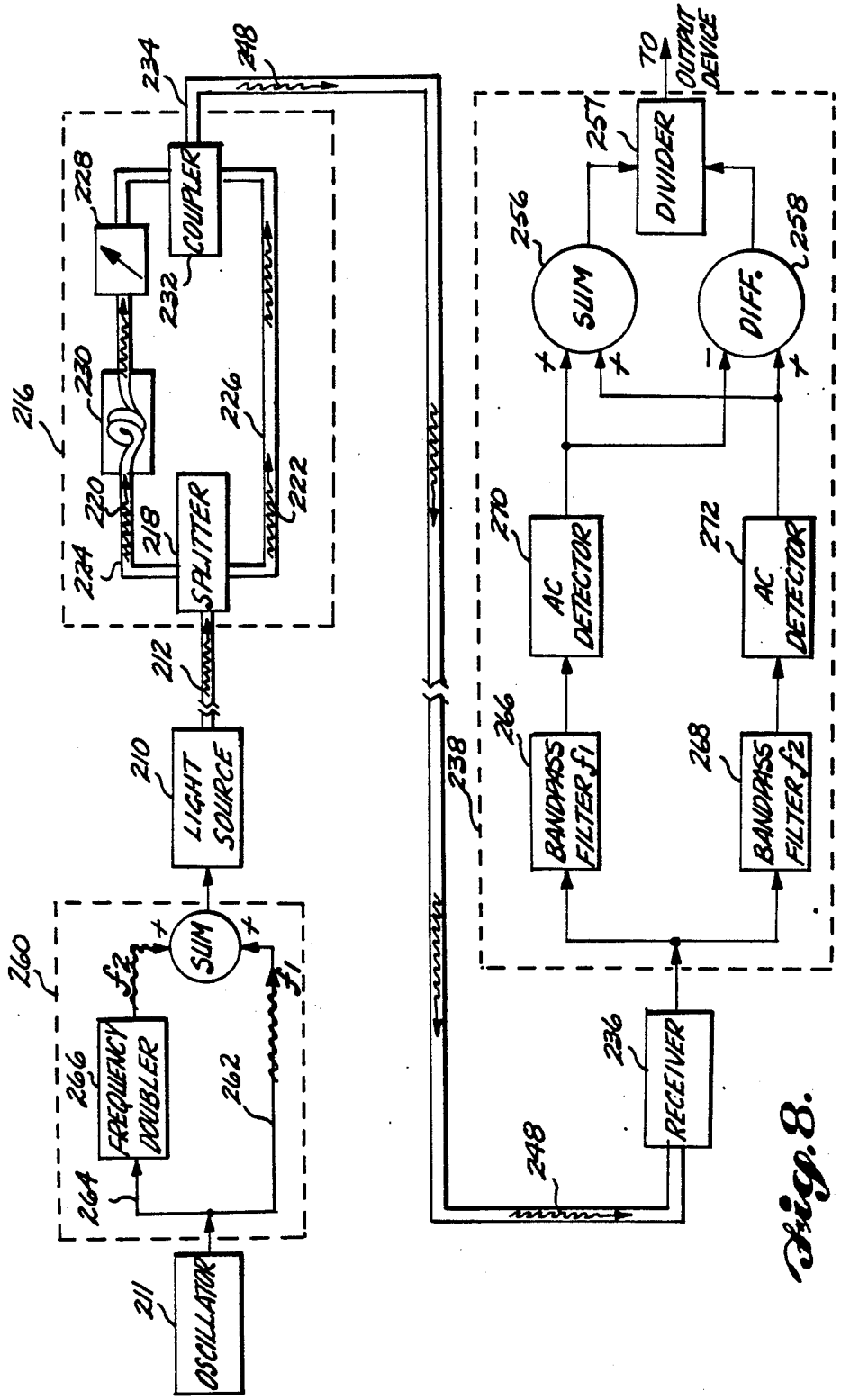
FIG. 8 is another alternative embodiment of this invention showing the circuitry for producing and processing a modified continuous wave optical signal.

With reference to FIG. 8, the above-mentioned distinct AC portions of the optical source signal are created by the inclusion of oscillator signal processing circuitry 260 between oscillator 211 and light source 210. As shown in FIG. 8, the continuous wave oscillator signal at frequency $f_1$ is applied to parallel branches 262 and 264 of circuitry 260. Frequency $f_1$ is such that its period is equal to twice the duration of the delay $t_d$ of the delay optical fiber 230. Within branch 262, frequency $f_1$ is unaltered. Within branch 264, frequency $f_1$ is doubled (which results in its period equalling $t_d$) by frequency doubler circuitry 266 so as to result in frequency $f_2$. It is noted that frequency $f_2$ can alternatively be formed by an independent oscillator. Furthermore, it will become apparent upon reading this description that frequency $f_2$ can be formed to be any even harmonic of frequency $f_1$ (i.e., $2f_1$, $4f_1$, $6f_1$, etc.). In any event, both frequencies preferably have matched amplitudes thereby obviating the need for incorporating additional compensation in the signal processing circuitry. With continued reference to FIG. 8, both frequencies are combined into a single signal upstream of the modulated light source 210 such that the resulting source optical signal 212 propagates through the system as a continuous composite waveform formed by the addition of the two oscillator signals having frequencies $f_1$ and $f_2$, which have distinguishable AC portions. Using a sine wave again for ease of analysis, at the point where the composite waveform signal passes through splitter 218 the intensity of each resulting component signal is described as:

$$(\tfrac{1}{2})(I_a\delta'\cos(\omega t)+I_a\delta'\cos(2\omega t)+2I_a\delta').$$

The DC or time-average portions ($2I_a\delta'$) will be removed by AC coupling networks in the receiver and are not necessary for the purposes of this embodiment, and therefore will not be considered further.

Upon exiting the transducer 228 the intensity of component signal 220 is described:

$$I_s''=(\alpha/2)I_a\delta'\cos(\omega(t-t_d))+(\alpha/2)I_a\delta'\cos(2\omega(t-t_d)).$$

In the above expression, the first term, $(\alpha/2)I_a\delta'\cos(\omega(t-t_d))$, is representative of the AC portion of the composite signal that is defined by frequency $f_1$ and has a period equal to $2t_d$. The second term, $(\alpha/2)I_a\delta'\cos(2\omega(t-t_d))$, is representative of the AC portion of the composite signal that is defined by frequency $f_2$ that has a period equal to $t_d$. Thus, the portion of the signal represented by the first term is delayed one half cycle or $\pi$ radians, while the portion of the signal represented by the second term is delayed a full cycle or $2\pi$ radians. Substituting for $t_d$ in the above yields:

$$I'_s=(\alpha/2)I_a\delta'\cos(\omega t-\pi)+(\alpha/2)I_a\delta'\cos(2\omega t-2\pi).$$

and, with $\cos(\omega t-\pi)=-\cos(\omega t)$
and $\cos(\omega t-2\pi)=\cos(\omega t)$
further substitution yields:

$$I'_s=-(\alpha/2)I_a\delta'\cos(\omega t)+(\alpha/2)I_a\delta'\cos(2\omega t).$$

The intensity of component signal 222 propagating within branch optical waveguide 226 is described:

$$I'_r=(\tfrac{1}{2})I_a\delta'\cos(\omega t)+(\tfrac{1}{2})I_a\delta'\cos(2\omega t).$$

As in previous embodiments, within coupler 232 the component signals 220 and 222 are combined to form composite signal 248 for propagation along the return optical waveguide 234. That signal has intensity $I''_c$ or $$I_c''=-(\alpha/2)I_a\delta'\cos(\omega t)+(\tfrac{1}{2})I_a\delta'\cos(\omega t)+(\alpha/2)I_a\delta'\cos(2\omega t)+(I_a/2)\delta'\cos(2\omega t)$$

Which reduces to $$(I_a/2)\delta'(1-\alpha)\cos(\omega t)+(I_a/2)\delta'(1+\alpha)\cos(2\omega t).$$

As described earlier, the intensity varying factors between and including the coupler 232 and receiver 236 are represented by $\delta''$. The intensity of the composite signal at the receiver is therefore described as $$I_{cd}'' = (I_a/2)\delta'\delta''(1-\alpha)\cos(\omega t) + (I_a/2)\delta'\delta''(1+\alpha)\cos(2\omega t)$$

$$= v(1-\alpha)\cos(\omega t) + v(1+\alpha)\cos(2\omega t),$$

where v, as before, $=(I_a/2)\delta'\delta''$.

It is noted that the first term of the above expression, due to the one-half cycle delay, includes any destructive interference effects (as evidenced by the $(1-\alpha)$ term). On the other hand, the second term of the expression includes the effects of the constructive interference since that portion of the composite wave was delayed a full cycle. Therefore, as developed earlier, addition of the first and second term (after filtering and detection) will yield a signal unaffected by the variation function $\alpha$ of the transducer, i.e., a reference signal. Subtracting the first term from the second term will yield a signal that includes the effects of $\alpha$.

The processing circuitry 238 for this embodiment is also shown in FIG. 8, wherein the composite signal 248 is converted in receiver 236 from an optical signal to a representative electrical signal and then branched through parallel band-pass filters 266 and 268. Band-pass filter 266 is tuned to extract the portion of the signal having frequency $f_1$ and represented by the term $v(1-\alpha)\cos(\omega t)$. Band-pass filter 268 is tuned to extract the portion of the signal having frequency $f_2$ and represented by the term $v(1+\alpha)\cos(2\omega t)$. Parallel AC detectors 270 and 272 detect the peak magnitude values of their associated signals $v(1-\alpha)$ and $v(1+\alpha)$ respectively. The output, $v(1-\alpha)$, of AC detector 270, is added to the output, $v(1+\alpha)$, of AC dectector 272, in sum circuit 256, yielding a reference signal of magnitude 2 v. The output of AC detector 270 is subtracted from the output of AC detector 272 in difference circuit 258 to yield a sensed signal of magnitude 2 v$\alpha$. The sensed and reference signals are then divided in the divider circuitry 257 to yield the variation function of the transducer $\alpha$.

Figure 9:
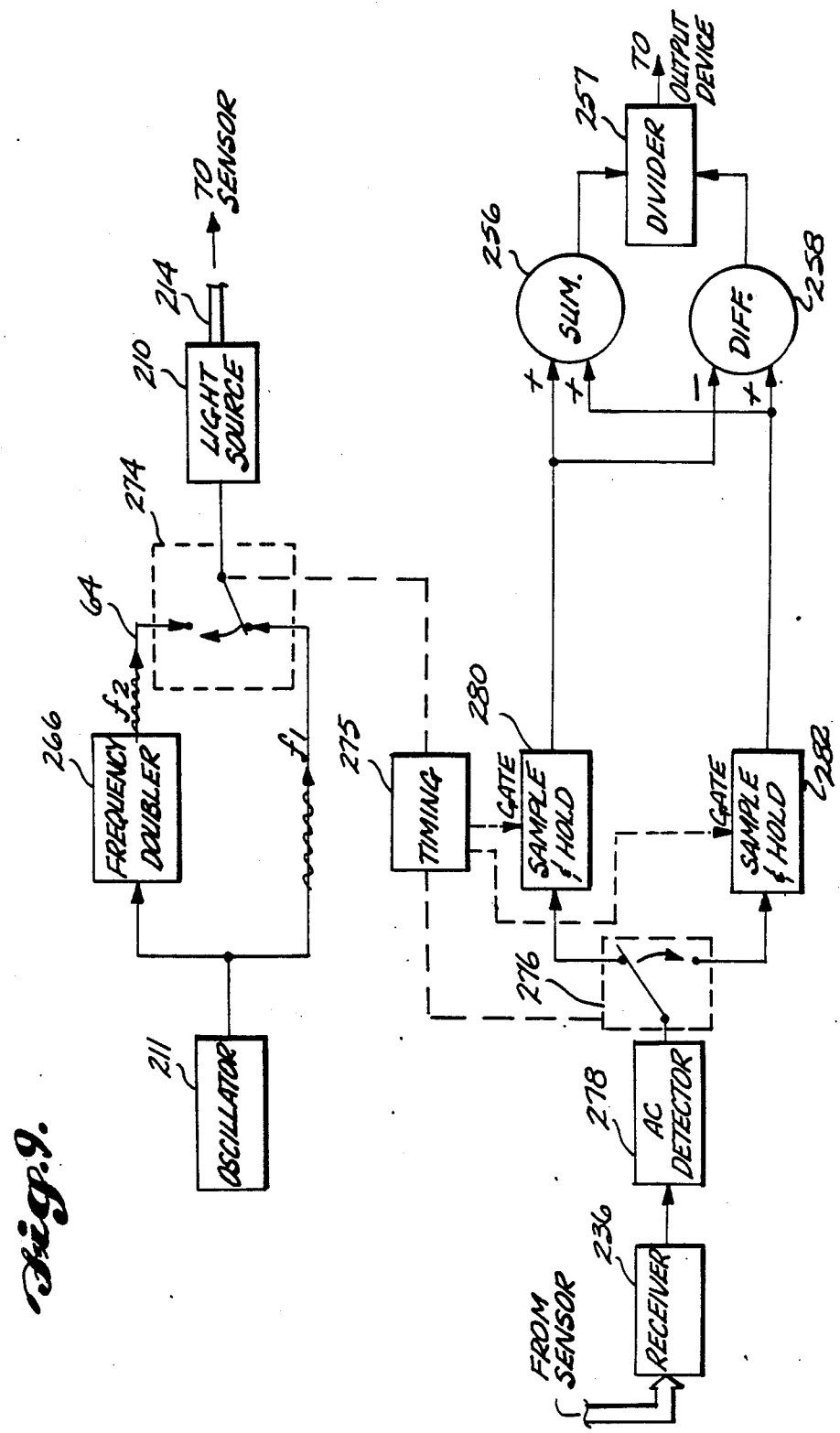
FIG. 9 illustrates alternative means for producing and processing a modified continuous wave optical signal.

In the embodiment just described and illustrated in FIG. 8, the portions of the composite signal having frequencies $f_1$ and $f_2$ were separated for processing by the band-pass filters 266 and 268. As another approach to this embodiment, as shown in FIG. 9, these portions can be separated in time upon generation by switch 274 and then, synchronized by interconnected timing circuitry 275, by switch 276 at the receiver end, which causes each element (having been reduced to peak magnitude values $v(1-\alpha)$ and $v(1+\alpha)$ by AC detector 278) to be accepted by the proper sample and hold circuits 280 and 282 for transmission through the sum 256, difference 258 and divider circuitry 257 as before. As shown in the figure, timing circuitry 275 includes gate control for the sample and hold circuits 280 and 282. Of course, in lieu of discrete switching, it is possible to sweep (for example in sinusoidal fashion) between frequencies $f_1$ and $f_2$; the sample and hold circuits 280 and 282 in this case being replaced with maxima and minima detection and hold circuits. The subsequent processing would be the same as earlier described.

In the embodiments earlier described and illustrated in FIGS. 8 and 9, the signal having frequency $f_2$, and period equal to $t_d$, was added to the signal having frequency $f_1$ to create a composite waveform optical signal with distinquishable AC portions—thereby eliminating the need for a receiver sensitive to the DC portion of the composite signal. As an alternative, it is also possible to create a composite waveform wherein one of the frequencies is so low that its period is long relative to the delay duration $t_d$. Thus, this low frequency of the composite waveform will be substantially unaffected by the delay imparted by the delay optical fiber. The significance of using such a low frequency is best understood upon reading the following description which follows the mathematical treatment offered earlier. Specifically, with reference to FIG. 10, electrical signal $f_h$ generated by oscillator 311 and having an amplitude $K_h$ is itself modulated by electrical signal $f_1$, which is generated by oscillator 313 and has amplitude $K_1$. The resulting signal $f_h f_1$ described by its AC and DC portions is:

$(K_h \cos(\omega_h t) + K_h)(K_1 \cos(\omega_1 t) + K_1)$ or $K_h K_1 (\cos(\omega_h t) \cos(\omega_1 t) + \cos(\omega_h t) + \cos(\omega_1 t) + 1)$ as before, the DC or time-average portion can be ignored. With K defined as $K_h K_1$ and using a standard trigonometric identity the resulting signal is:

$K((\frac{1}{2})\cos(\omega_h - \omega_1)t + (\frac{1}{2})\cos(\omega_h + \omega_1)t + \cos \omega_h t + \cos \omega_1 t)$.

Filter 315, centered around the frequency $f_h$ removes the upper and lower side band terms and yields:

$K \cos(\omega_h t) + K \cos(\omega_1 t)$.

This expression describes the electrical signal that modulates light source 310 to produce source optical signal 312. It is noted that the above described technique of creating the signal avoids the need for matching amplitudes $K_h$ and $K_1$, which would be necessary if the signals of frequencies $f_h$ and $f_1$ are merely added. Rewriting the above expression in terms of the average value of the modulated source intensity $I_a$ yields the mathematical description of the optical signal propagating from light source 310:

$I_a \cos(\omega_h t) + I_a \cos(\omega_1 t)$.

In the above expression the first term represents the AC portion of the composite signal that is defined by frequency $f_h$. The second term represents the AC portion of the composite signal that is defined by frequency $f_1$.

Figure 10:
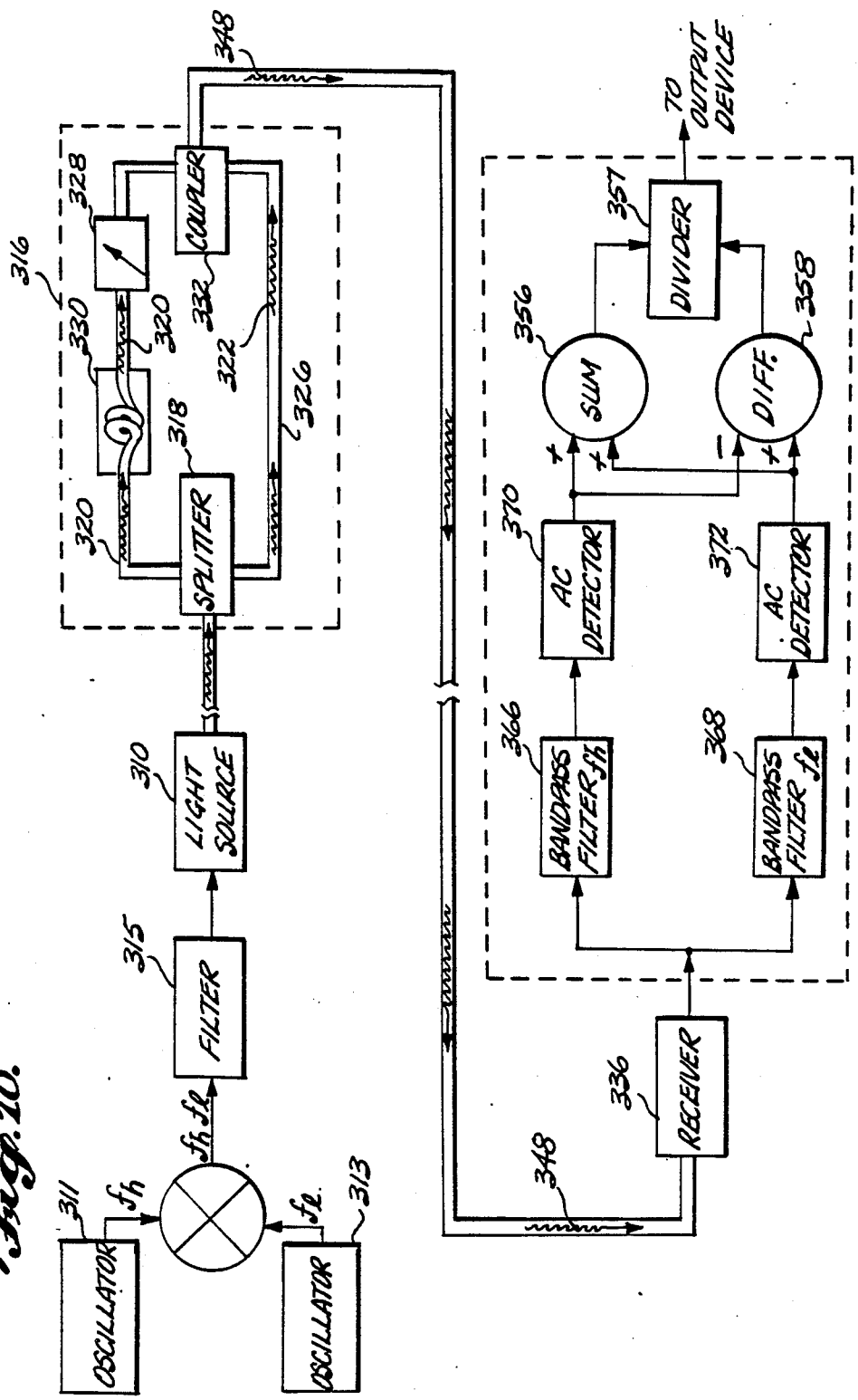
FIG. 10 is a block diagram of an alternative embodiment of this invention wherein the signal producing the continuous wave optical signal is itself modulated prior to such production.

Using the mathematical treatment developed in detail in connection with the embodiment shown in FIG. 8 and referring to FIG. 10 the intensity $I_s'''$ of component signal 320 upon exiting the transducer 328 is described:

$I_s''' = (\alpha/2)I_a \delta' \cos(\omega_h(t-t_d)) + (\alpha/2)I_a \delta' \cos(\omega_1(t-t_d))$.

The frequency $f_h$ is selected so that the period of the portion of the signal having frequency $f_h$ (i.e., the first term of the above expression) is equal to $2t_d$. Thus, this portion of the signal is delayed one-half cycle or $\pi$ radians due to propagation through delay optical fiber 330. As noted, in this embodiment, the frequency $f_1$ is selected so that its period is very long with respect to the duration of delay $t_d$. Thus for example if $f_1 = f_h/100$, then the portion of the signal represented by the second term in the above expression is delayed $\pi/100$ radians.

Substitution yields:

$I_s''' = (\alpha/2)I_a \delta' \cos(\omega_h t - \pi) + (\alpha/2)I_a \delta' \cos(\omega_1 t - \pi/100)$ or $= -(\alpha/2)I_a \delta' \cos(\omega_h t) + (\alpha/2)I_a \delta'(\cos \omega_1 t)$.

Here $\cos(\omega_h t - \pi/100)$ was treated as $\cos(\omega_h t - 0)$ which introduces a maximum error of the resultant transducer variation function $\alpha$, without compensation, of only 0.012%. Therefore, within that tolerance, the intensity of the composite signal 348 emanating from the coupler (i.e., after combining component signals 320 and 322 temporarily ignoring losses caused by the coupler) is $I_c''' = -(\alpha/2)I_a \delta' \cos(\omega_h t) + (\alpha/2)I_a \delta' \cos(\omega_1 t) + (I_a/2)\delta' \cos(\omega_h t) + (I_a/2)\delta' \cos(\omega_1 t)$.

The intensity of the composite signal at the receiver 336 (i.e., including intensity variation factor $\delta''$) after substituting $v = (I_a/2)\delta'\delta''$ is:

$I_{cd}''' = v(1-\alpha)\cos(\omega_h t) + v(1+\alpha)\cos(\omega_1 t)$.

In the processing shown in FIG. 10, band-pass filters 366 and 368 are tuned to frequencies $f_h$ and $f_1$ respectively. Hence processing of the above signal to yield the value of the transducer variation function $\alpha$ is accomplished in a manner substantially identical to that described in the embodiment depicted in FIG. 8 and will not be repeated here.

Figure 11:
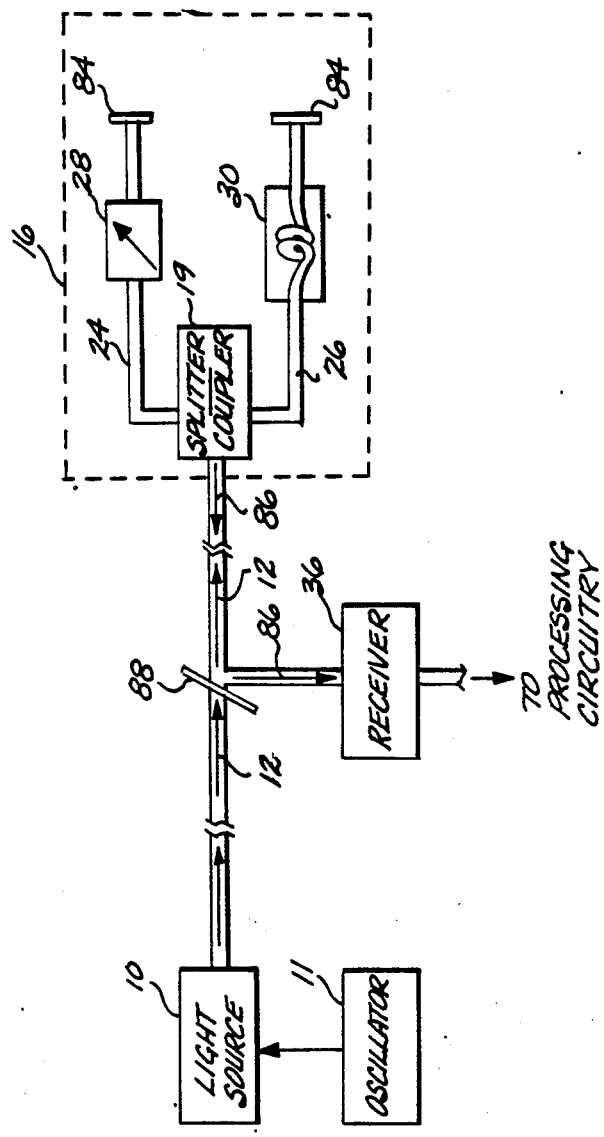
FIG. 11 is a diagram of an alternative embodiment for this invention employing reflective devices to direct the signal from the sensor unit back along the main optical waveguide to a receiver.

All of the above-described embodiments discuss single direction transmission of the various signals. With reference to FIG. 11 it is pointed out that sensor unit 16 can also be modified so that branch optical waveguide 24 and branch optical waveguide 26 terminate at mirrors or other reflective elements 84. The component signals are therefore reflected back to the splitter/coupler 19 where they are recombined onto the main optical waveguide 14 and travel as combined reflected signal 86. A splitter 88 directs the combined signal from the main optical waveguide to receiver 36 and the processing circuitry. This approach eliminates the need for a separate return optical waveguide extending between the sensor and receiver.

Figure 12:
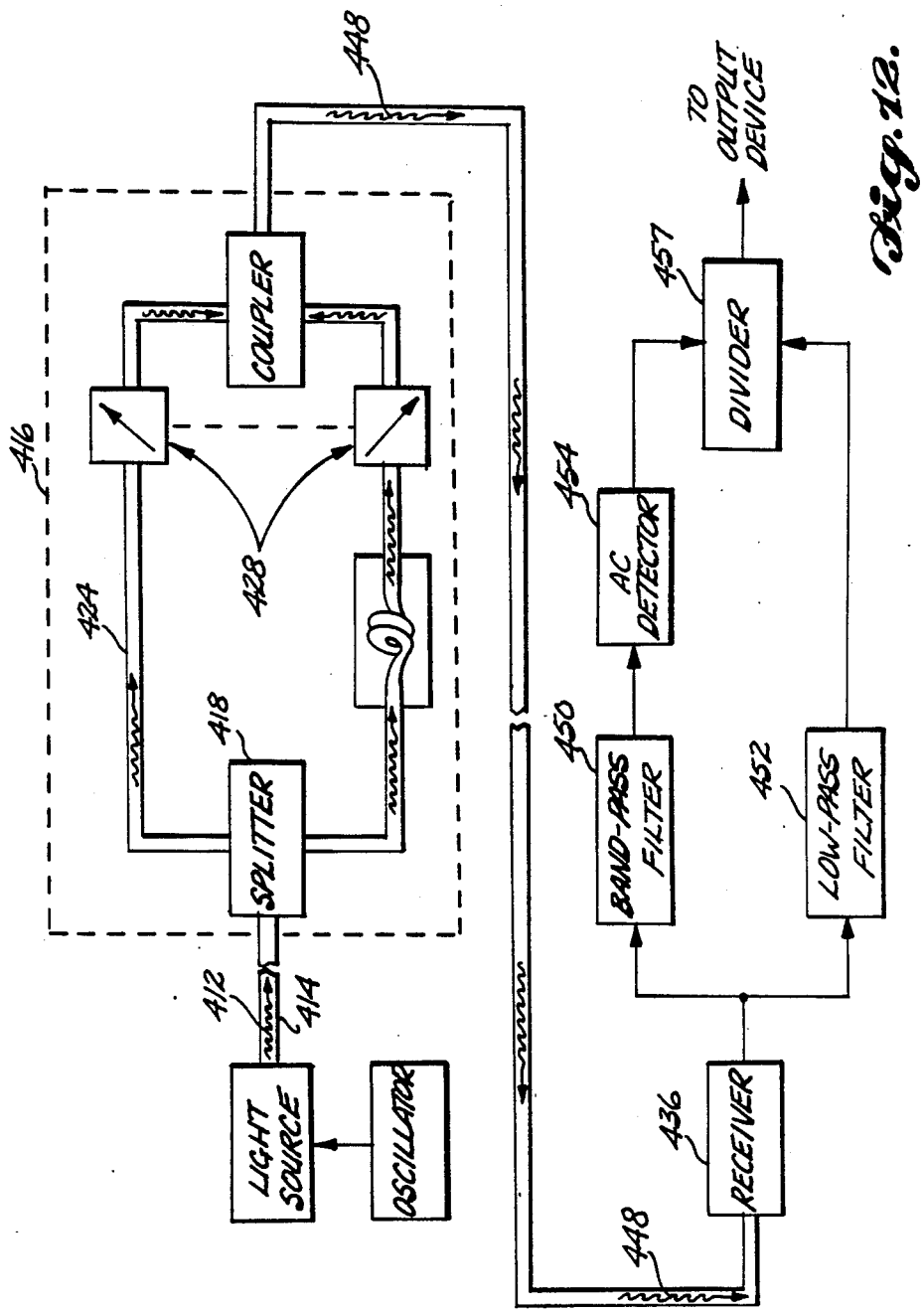
FIG. 12 is a diagram of an alternative embodiment of this invention wherein a differential-type transducer is employed.

In all of the previously mentioned embodiments, a single transducer is incorporated into one of the branch optical waveguides. As a modification to all of the above-described embodiments, it is pointed out that a differential transducer scheme can also be employed. For example, as shown in FIG. 12, transducer 428 is a differential type transducer wherein as the attenuation of the intensity of the signal in branch optical waveguide 424 increases, the attenuation in branch optical waveguide 426 decreases in complementary fashion. If a continuous wave optical source 412 is transmitted through the system, and by employing the same analysis and symbols as developed for the description accompanying FIG. 7, the intensity of the composite signal 448 reaching receiver 436 is $$I_{cd}'''' = (\alpha/2)I_a\delta'\delta'' \cos(\omega t) + (\alpha/2)I_a\delta'\delta'' + (1-\alpha)(I_a/2)\delta'\delta'' \cos(\omega t - \pi) + ((1-\alpha/2)I_a\delta'\delta''$$

substituting and factoring out $v = (I_a\delta'\delta'')/2$ yields:

$$I_{cd}'''' = v + 2 v\alpha \cos(\omega t) - v \cos(\omega t).$$

From the above expression it can be seen that the DC portion of the composite signal is independent of the transducer variation function $\alpha$, thus the value of the Dc portion after passing through low-pass filter 452 is used as a reference signal. The AC portion, variable with $\alpha$ is treated as the sensed signal. The AC portion is isolated in band-pass filter 450 and then passes through AC detector 454 which yields its peak value: $(2 v\alpha - v)$. This sensed value $(2 v\alpha - v)$ is then normalized with respect to the reference value $v$ by the simple ratio operation performed by the divider circuitry 457. The output value of the divider circuitry $(2\alpha - 1)$ is a function of $\alpha$, independent of any intensity variation factors and can be further processed to yield $\alpha$ and/or the value of the sensed parameter.

Again, it is pointed out that the signals and related processing for the embodiments earlier-described with reference to FIGS. 8, 9, 10 and 11 can also be utilized with the differential type transducer just described.

For the above-described embodiments, sensor units 116, 216, 316 and 416 can employ more than one transducer or delay optical fiber with at least one distinguishable reference signal propagating through the sensor unit unaffected by a transducer for comparison with any of the sensed signals. When more than one delay optical fiber is employed, the duration $t_d$ of any one delay must be unequal to the duration of any other so that all component signals can be distinguished by the receiver. Furthermore, an array of sensor units can be coupled to the main optical waveguide wherein the sensed and reference signals are multiplexed onto the return optical waveguide (or onto the main optical waveguide if a reflective approach is used as discussed earlier with reference to FIG. 11) and then demultiplexed and processed as before.

It is to be clearly understood by those skilled in the art that the invention is not limited to the embodiments described above. Rather, the scope of the invention is to be interpreted only in conjunction with the appended claims.

The embodiments of the invention in which an exclusive property or privilege is claimed are defined as follows:

1. A fiber optic sensing system comprising:
   (a) a source for producing an optical signal of any selected intensity;
   (b) a receiver;
   (c) an optical waveguide element interconnected between the source and the receiver, the optical waveguide element providing a single path for propagation of the optical signal between the source and the receiver;
   (d) a sensor unit connected to the optical waveguide element between the source and the receiver, the sensor unit including two branch optical waveguides, each branch optical waveguide having an input end and an output end, the branch optical waveguides being coupled in common to the optical waveguide element at both their input and output ends, the branch optical waveguides being configured and arranged so that a component of the optical signal propagates through each branch optical waveguide;
   (e) delay means coupled to one of the branch optical waveguides between its input end and its output end for delaying the propagation of the component of the optical signal that is associated with the branch optical waveguide to which the delay means is connected; and,
   (f) transducer means associated with one of the branch optical waveguides between its input end and its output end for varying the intensity of the component of the optical signal that is asssociated with the branch optical waveguide to which the transducer means is connected.

2. The fiber optic sensing system of claim 1 further comprising signal processing means for processing the components of the optical signal to determine, and provide an indication of, the variation of the component intensity effected by the transducer means.

3. The system of claim 2 wherein the signal processing means includes comparison means for identifying each component of the optical signal and for calculating the ratio of the intensity of the component of the optical signal that is varied by the transducer means to the intensity of the component that is not varied by the transducer means.

4. The system of claim 1 wherein the delay means is an additional portion of the branch optical waveguide to which it is interconnected.

5. The system of claim 1 wherein the source-produced optical signal is composed of discrete pulses.

6. The system of claim 1 wherein the source-produced optical signal is a continuous wave, the sensor unit being configured so that the waveform of the optical signal propagating between the sensor unit and the receiver is the composite of both the components.

7. The system of claim 6 wherein the composite waveform signal is defined by AC portions and DC portions; the system further comprising signal processing means for separating and determining the magnitude of the AC and DC portions and for determining the ratio of the difference between the AC and DC magnitudes to the sum of the AC and DC magnitudes.

8. The system of claim 6 wherein the delay imparted into the associated component signal by the delay means is substantially equal to one-half of the period of the continuous wave.

9. The system of claim 6 wherein the continuous wave signal includes first and second frequencies, the continuous wave signal being defined in part by first and second AC portions corresponding to said first and second frequencies; the system further comprising signal processing means for separating and determining the magnitudes of the first and second AC portions and for determining the ratio of the difference between the magnitudes of the first and second AC portions to the sum of the magnitudes of the first and second AC portions.

10. The system of claim 9 wherein the delay imparted into the associated component signal by the delay means is substantially equal to one-half the period of the first frequency of the composite waveform signal and is substantially equal to the period of the second frequency of the composite waveform signal.

11. A fiber optic sensor unit for varying the intensity of an optical signal propagating therethrough, wherein the optical signal is guided into and out of the sensor unit along an optical waveguide element having a single path for propagation of the optical signal, the sensor unit comprising:
   (a) two branch optical waveguides, each branch optical waveguide having an input end and an output end, the branch optical waveguides being coupled in common to the optical waveguide element at both their input and output ends, the branch optical waveguides being configured and arranged so that a component of the optical signal propagates through each of the branch optical waveguides;
   (b) delay means formed in one of the branch optical waveguides for delaying the propagation of the component signal that is associated with the branch optical waveguide to which the delay means is connected; and,
   (c) transducer means associated with one of the branch optical waveguides for varying the intensity of the component signal that propagates through the branch optical waveguide to which the transducer means is connected.

12. A fiber optic sensing syste for sensing an external parameter, comprising:
   (a) source means for producing a source optical signal having any selected intensity;
   (b) optical waveguide means connected to the source means for guiding propagation of the source optical signal along a single path;
   (c) splitter means connected to the optical waveguide means for splitting the propagating source optical signal into two or more component signals;
   (d) two or more branch optical waveguides connected to the optical waveguide and emanating from the splitter means, each branch optical waveguide guiding propagation of an associated component signal;
   (e) delay means connected to at least one of the branch optical waveguides for delaying the propagation of the component signal associated with that connected branch optical waveguide, the duration of the delay of any one delay means being unequal to the duration of the delay of any other delay means;
   (f) transducer means associated with at least one of the branch optical waveguides, the transducer means being responsive to the external parameter for varying the intensity of the component signal associated with the branch optical waveguide to which the transducer means is connected;
   (g) combining means connected to the branch optical waveguides for directing the component signals to the optical waveguide after the component signals have propagated through their associated delay means or transducer means;
   (h) signal processing means coupled to the optical waveguide for processing the component signals to determine and provide an indication of the variance of the component signal intensity effected solely by the transducer means.

13. The system of claim 1, 11 or 12 further including optical signal reflecting means for directing the component signals to the optical waveguide after the component signals have propagated through their associated delay means or transducer means.

14. The system of claim 12 wherein the signal processing means includes comparison means for identifying each component signal and for calculating the ratio of the magnitude of any component signal that is varied by the transducer means to the magnitude of a corresponding component signal that is not varied by the transducer means.

15. The system of claim 12 wherein the source optical signal is a continuous wave; the combining means being configured so that the waveform of the optical signal propagating therefrom is the composite of all the components; the composite waveform being defined by AC portions and DC portions; the signal processing means including comparison means for separating and determining the magnitude of the AC and DC portions and for determining the ratio of the difference between the AC and DC magnitudes to the sum of the AC and DC magnitudes.

16. The system of claim 12 wherein the delay means is an additional portion of the branch optical waveguide to which it is connected.

17. The system of claim 12 wherein the source optical signal is comprised of discrete pulses.

18. A fiber optic sensing system comprising:
   (a) a source for producing a continuous wave optical signal of any selected intensity;
   (b) a receiver;
   (c) an optical waveguide element interconnected between the source and the receiver, the optical waveguide element providing a single path for propagation of the optical signal between the source and the receiver;
   (d) a sensor unit connected to the optical waveguide element between the source and the receiver, the sensor unit including two or more branch optical waveguides, each branch optical waveguide having an input end and an output end, the branch optical waveguides being coupled in common to the optical waveguide element at both their input and output ends, the branch optical waveguides being configured and arranged so that a component of the optical signal propagates through each branch optical waveguide;

(e) delay means formed in one of the branch optical waveguides between its input end and its output end for delaying the propagation of the component of the optical signal that is associated with the branch optical waveguide through which the delay means is connected; and, (f) transducer means associated with each branch optical waveguide for varying the intensity of each component optical signal, the transducer means being configured and arranged so that the variation of the intensity of one component signal is complementary to the variation of intensity of the other component signal.

19. The system of claim 18 wherein the sensor unit is configured so that the optical signal propagating between the sensor unit and the receiver is the composite of each component of the continuous wave optical signal, the composite waveform signal being defined by AC portions and DC portions; the system further comprising signal processing means for separating and determining the magnitudes of the AC and DC portions and for determining the ratio of the AC to the DC magnitudes.

20. The system of claim 18 wherein the delay imparted into the associated component signal by the delay means is substantially equal to one-half of the period of the continuous wave.

21. The system of claim 18 wherein the continuous wave signal includes first and second frequencies, the continuous wave signal being defined in part by first and second AC portions corresponding to the first and second frequencies; the system further comprising signal processing means for separating and determining the magnitude of the first and second AC portions and for determining the ratio of the first AC magnitude to the second AC magnitude.

22. The system of claim 18, further including optical signal reflecting means for directing the component signals to the optical waveguide after the component signals have propagated through their associated delay means or transducer means.

* * * * *

UNITED STATES PATENT AND TRADEMARK OFFICE
CERTIFICATE OF CORRECTION

PATENT NO. : 4,681,395

DATED : July 21, 1987

INVENTOR(S) : Thomas A. Lindsay et al.

It is certified that error appears in the above-identified patent and that said Letters Patent is hereby corrected as shown below:

Column 6, line 57, "proceed" should be --proceeds--.
Column 7, line 50, "120" should be --124--.
Column 8, line 15, "$I_c'$" should be --$I'_c$--.
Column 8, line 60, "$I_{cd}'$" should be --$I'_{cd}$--.
Column 9, line 14, "signal" should be --signals--.
Column 9, line 42, "266" should be --265--.
Column 10, line 4, "$I_s''$" should be --$I''_s$--.
Column 10, line 37, "$I_c''$" should be --$I''_c$--.
Column 10, line 47, "$I_{cd}''$" should be --$I''_{cd}$--.
Column 10, line 59, "term" should be --terms--.
Column 11, line 9, "dectector" should be --detector--.
Column 12, line 10, "above described" should be --above-described--.
Column 12, line 31, "$I_s'''$" should be --$I'''_s$--.
Column 12, line 46, "$I_s'''$" should be --$I'''_s$--.
Column 12, line 59, "$I_c'''$" should be --$I'''_c$--.
Column 12, line 65, "$I_{cd}'''$" should be --$I'''_{cd}$--.
Column 13, line 13, "19" should be --18--.
Column 13, line 35, "$I_{cd}''''$" should be --$I''''_{cd}$--.
Column 13, line 37, "$(\omega t-\pi) + ((1-\alpha/2)I_a \, \delta' \, \delta''$" should be --$(\omega t-\pi) + ((1-\alpha)/2)I_a \, \delta' \, \delta''$--.
Column 13, line 41, "$I_{cd}''''$" should be --$I''''_{cd}$--.

UNITED STATES PATENT AND TRADEMARK OFFICE
CERTIFICATE OF CORRECTION

PATENT NO. : 4,681,395

DATED : July 21, 1987

INVENTOR(S) : Thomas A. Lindsay et al.

It is certified that error appears in the above-identified patent and that said Letters Patent is hereby corrected as shown below:

Column 13, line 46, "Dc" should be --DC--.
Column 13, line 48, insert --,-- (comma) after "α".
Column 15, line 59, "syste" should be --system--.

In FIGURES 8 and 9, reference numerals "266", referencing a "FREQUENCY DOUBLER" should be reference numerals --265--.

Signed and Sealed this

Fifth Day of January, 1988

Attest:

DONALD J. QUIGG

*Attesting Officer*   *Commissioner of Patents and Trademarks*